Figure 1:
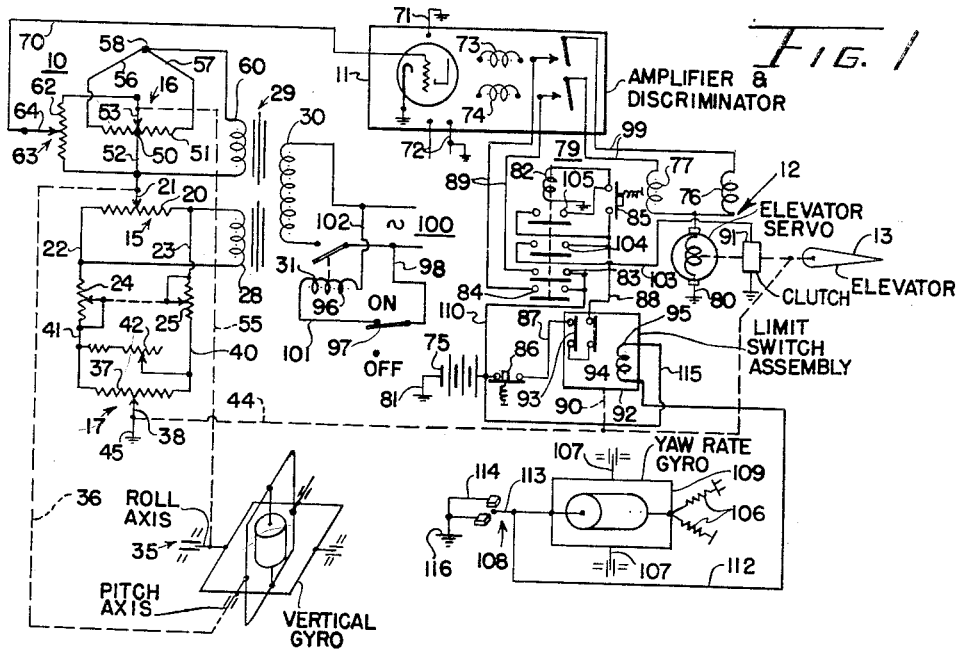

Dec. 15, 1953   G. W. RUSLER, JR., ET AL   2,663,001
VARIABLE LIMIT SWITCH ASSEMBLY
Filed Oct. 13, 1952

INVENTORS
GEORGE W. RUSLER JR.
BY ROBERT C. BURGGREN

George H Fisher
ATTORNEY

Patented Dec. 15, 1953

2,663,001

UNITED STATES PATENT OFFICE 2,663,001

VARIABLE LIMIT SWITCH ASSEMBLY

George W. Rusler, Jr., and Robert C. Burggren, Minneapolis, Minn., assignors to Minneapolis-Honeywell Regulator Company, Minneapolis, Minn., a corporation of Delaware Application October 13, 1952, Serial No. 314,518

17 Claims. (Cl. 318—489)

Our invention relates to flight control apparatus and more particularly to an improved flight control apparatus in which the servomotor operating the flight control surface of an aircraft includes a variable limit switch assembly which operates as a safety device to prohibit that an aircraft under automatic control be positioned by the servomotor through extreme attitude changes exceeding structural limitations of the parts of the aircraft.

In the co-pending application of Benjamin H. Ciscel, application Serial No. 204,924, filed January 8, 1951, on Flight Control Apparatus, an apparatus for controlling the operation of the servomotor and hence the displacement of the elevator control surface of an aircraft within predetermined limits depending upon the speed of the aircraft is disclosed. In that application it was recognized that the speed of an aircraft had a definite effect upon the required displacement of the control surface to perform or obtain given attitude displacements of the aircraft. It was recognized that for high airspeeds very small displacements of the control surface were required to perform satisfactory controlling operation and conversely wide angle displacements of the control surface were required for given attitude changes at low airspeeds. It was recognized that structural limits of the aircraft could easily be exceeded by attempted wide angle displacements of the control surface while the aircraft was traveling at high speed. The solution in that invention to provide a safety device to prohibit the control surface beyond desired displacement limits was to sense airspeed and control a plurality of pairs of limit switches or place the control of the servomotor under a plurality of pairs of limit switches depending upon the airspeed sensed.

In the subject apparatus, only a single pair of limit switches are utilized and these switches are varied in position with respect to one another depending upon the position of the control surface of the aircraft. This apparatus relates speed of travel of the aircraft with any non-accelerated flight attitude of the aircraft such as straight and level flight. The allowable travel limits of the control surface for safe flight are then determined from a reference position which is a trim position or a position of the control surface to maintain non-accelerated flight for a given airspeed and the limit switch differential is adjusted in proportion to these limits. The limit switches are positioned by a flexible coupling which averages the various positions assumed by the servomotor to position the switches in proportion to the average position of the servomotor such that if the servomotor departs rapidly from the average position and hence beyond limits established for safe operation of the aircraft, one or the other of the limit switches is operated. With the operation of the limit switches, control of the aircraft is returned to the operator and hence the apparatus guards against malfunction of the automatic pilot.

It is therefore an object of this invention to provide an improved flight control apparatus for the aircraft which limits automatic control with established safe operating limits.

It is also an object of this invention to provide a simplified apparatus for limiting displacement of the control surfaces as a function of airspeed without requiring special equipment to sense airspeed.

A further object of this invention is to provide an improved limit switch assembly operated by a servomotor in an automatic flight control apparatus to protect against malfunction of the flight control apparatus.

It is further an object of this invention to provide in an improved flight control apparatus a means for discontinuing operation of the limit switch assembly during turns of the aircraft.

Figure 2:
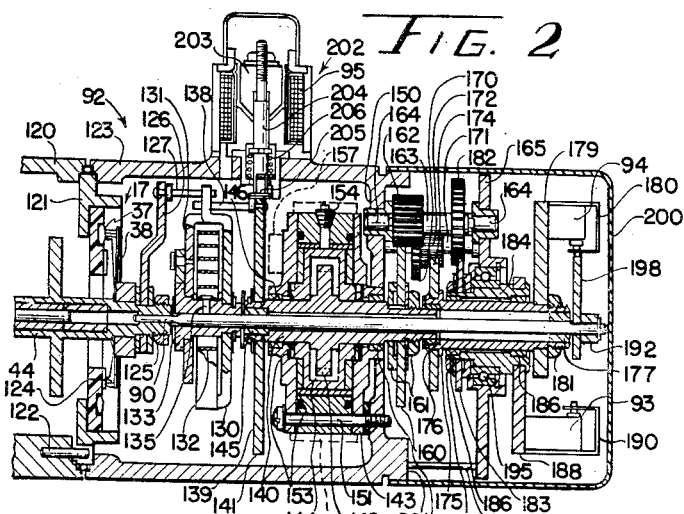
Figure 5:
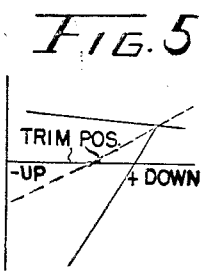
Figure 3:
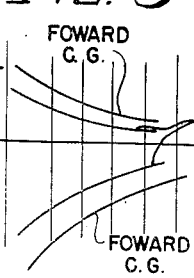
Figure 4:
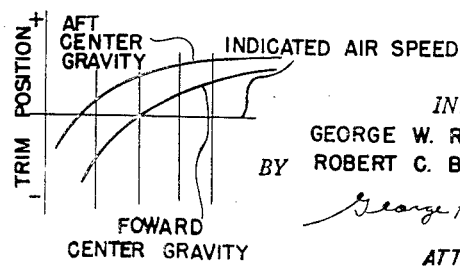

These and other objects of this invention will become apparent from the reading of the attached description together with the drawings in which:

Figure 1 is a schematic circuit of the improved flight control apparatus;

Figure 2 is a detailed view in section of the improved limit switch assembly of the subject flight control apparatus; and Figures 3, 4 and 5 are a group of plots of aerodynamic characteristics of an aircraft, Figure 3 showing the relationship between allowable travel of the elevator control surface referenced to the trim position of the elevator plotted against indicated airspeed for given center of gravities of the aircraft, Figure 4 showing a plot of trim position against indicated airspeed for the various center of gravities of the aircraft and Figure 5, a composite plot of Figures 3 and 4, showing allowable travel of the elevator control surface referenced to the streamlined position of the elevator and plotted against trim position of the elevator.

Our improved flight control apparatus including the variable limit switch assembly of the subject invention applies to automatic control of the aircraft about the pitch axis or relative to the control of the elevator surface of the aircraft. It is in this axis of flight that the effect of the acceleration of gravity on the mass of the aircraft together with the acceleration imparted to the craft due to manipulation of the elevator control surface often exceed the structural limitations of the lift surface of the craft, that is the wings. In the present invention, as will be pointed out as the disclosure proceeds, the speed at which an aircraft is traveling is related to the position of the elevator control surface for given flight attitudes, namely non-accelerated flight such as level flight attitude. It has previously been recognized that to avoid overstress of an aircraft of a given gross weight, that the control surface must be kept within allowable deflection limits from a control surface position, known as trim position. These allowable deflection limits are determined by and are a function of indicated airspeed of the aircraft and the center of gravity location—as will be seen in Figure 3 of the drawings. The trim position of the aircraft for the given gross weight is also a function of indicated airspeed and center of gravity location as shown in Figure 4 of the drawings. As noted above, the data of Figures 3 and 4 provides the plot of allowable elevator travel limits from the trim position versus the elevator trim position shown in Figure 5 in which the center of gravity locations of the before mentioned plots are coincident.

In the present invention and except for turning flight attitudes it is assumed that the elevator deflections from trim positions are random, so that the short-time average of the elevator position will be the trim position. The limit switches are positioned in accordance with this short time average which in turn determines the elevator travel limits. Apparatus whose time averaging gives a measure of the trim position positions the switches through differential gearing in accordance with the allowable travel limit plots.

In the present invention our improved flight control apparatus and limit switch assembly is shown in conjunction, in Figure 1, with a schematic disclosure of the electrical circuit for the elevator channel of an automatic pilot for an aircraft. Reference can be made to the above mentioned Ciscel and Gille applications for similar control circuits. As shown in Figure 1, the elevator channel is composed of a network indicated generally as 10 controlling the operation of an amplifier indicated generally at 11 whose output controls the energization of the servomotor 12, the servomotor being connected to and driving the elevator control surface indicated generally at 13. The network 10 is largely conventional and consists primarily of a pitch axis controller or potentiometer indicated at 15, an up elevator controller or potentiometer indicated at 16, and a servo balance potentiometer or controller indicated at 17. The pitch axis potentiometer includes a resistor 20 and wiper 21, the resistor 20 being connected by conductors 22, 23 to a pair of centering potentiometers 24, 25. The resistor 20 is energized from a secondary winding 28 of a transformer 29, primary winding 30 of which is connected through a relay indicated at 31 to an alternating current source of power 100. Wiper 21 of the pitch axis potentiometer is operated by a vertical gyroscope indicated at 35 through a connection schematically disclosed at 36 connected to the pitch displacement axis of the gyroscope. Gyroscope 35 is schematically disclosed in Figure 1 and since its details form no part of the subject invention they will not be included herein. Servo balance potentiometer 17 which includes a resistor 37 and wiper 38 is connected in a bridge type circuit with the pitch axis potentiometer 15, the resistor 37 being connected by conductors 40, 41 to the centering potentiometers 25, 24 respectively. Also included in the network is a ratio potentiometer 42 which is connected between conductors 40, 41 and adjusts the level of the signal inserted in the bridge circuit by the servo balance potentiometer. Wiper 38 of the servo balance potentiometer 17 is operatively connected to the output shaft or armature of the servomotor 12 through a connection indicated at 44 and is grounded at 45 for purposes to be later described. It will thus be seen that the pitch axis potentiometer 15 and servo balance potentiometer 17 form a bridge circuit energized from the secondary winding 28 of transformer 29 with the output of the bridge appearing across the wipers 21 and 38 of the pitch axis potentiometer and servo balance potentiometers respectively. The wiper 21 of the pitch axis potentiometer is also connected to a center tap 50 of a resistor 51 of the up-elevator potentiometer 16 through a conductor 52. The up-elevator potentiometer includes a wiper 53 which is connected to the roll axis of the vertical gyroscope 35 through a connection indicated at 55. The extremities of the winding for resistor 51 of the up-elevator potentiometer are connected by conductors 56, 57 to a common point 58 and the up-elevator potentiometer is energized from a secondary winding 60 of transformer 29 which connects to the common point 58 and conductor 52 leading to the tap 50 of resistor 51. Also connected to wiper 53 is one extremity of a winding 62 of a trimmer potentiometer 63, the opposite extremity of the winding being connected to the conductor 52. Trimmer potentiometer 63 has a wiper 64 which when positioned along the resistor 62 determines what portion of the up-elevator signal will be included in the output of the network 10. Trimmer potentiometer 63 is connected in a voltage divider arrangement with the up-elevator potentiometer which is so arranged that it supplies a signal in the same direction to the output of network 10 or in the same sense irregardless of the position to either side of the center tap 50 that the wiper 53 is moved. The specific circuitry of the up-elevator potentiometer is also shown in the above-mentioned co-pending applications of Benjamin Ciscel and Willis Gille and is shown herein only to indicate that in normal automatic pilot operation in the elevator channel of an aircraft, an up-elevator signal is supplied to the controlling servomotor upon banking of the aircraft indicating the entry into a turn for the purpose of maintaining altitude in a turn. It will therefore be seen that the output of the bridge circuit formed by the servo balance potentiometer 17 and pitch axis potentiometer 15 is added to the output of the up-elevator potentiometer through a trimmer potentiometer 63 or voltage divider which determines what portion of the up-elevator signal will be added in series with the before-mentioned bridge circuit. The output of this network is connected by a conductor 70 which leads from the wiper 64 of the trimmer potentiometer 63 to the input stage of a discriminator amplifier shown schematically in the drawing at 11. This discriminating type amplifier is shown schematically herein inasmuch as its details form no part of the subject invention and reference may be had to the Gille et al. Patent 2,425,733, dated August 19, 1947, for a disclosure of the same. The input stage of this discriminating amplifier also includes a grounded terminal indicated at 71 which grounded terminal completes with grounded terminal 45 the electrical circuit through the network 10. The discriminating amplifier 11 also includes power terminals indicated schematically at 72 and a pair of discriminating relays 73, 74 including contact mechanisms which control the application of D. C. power from a source indicated at 75 to one or the other of the directional field windings 76, 77 of the servomotor 12 and through the armature of the servomotor to a grounded connection indicated at 80 through a circuit to be more fully described above.

The D. C. power supply 75 indicated herein as a battery source, and grounded at 81, feeds the power or energizing circuits for the automatic pilot through an engage relay indicated at 79. The engage relay includes energizing coil 82 and a pair of contacts 83, 84 connected in series with the relay contacts 73, 74 of the discriminator amplifier and the field windings 76, 77 of the servomotor. The power circuit also includes a momentary disengage switch 86 and a momentary engage switch 85 as well as a holding contact 105 on relay 73 and a contact 104 to control the energization of a clutch 91 connecting the elevator or control surface of the aircraft to the armature or output shaft of the servomotor 12. The energizing circuit for the engage relay is as follows: battery 75 to normally closed disengage switch 86, conductor 87 to a limit switch contacts 93, 94, conductor 88 to normally open momentary engage switch 85, to coil 82 and a ground connection returning through the ground connection 81 of battery 75. Closure of the momentary engage switch 85 energizes the relay coil 82 and with the closure of the contacts, the holding contact 105 is closed setting up a holding circuit around the momentary switch 85 in a well known manner. The clutch 91 will simultaneously be energized from the plus side of the battery through conductor 88 and contact 104 to a conductor 103 and clutch 91 and from the grounded side of the clutch to the grounded terminal 81 of the battery. Further, closure of the relay 79 will operate or close the contacts 83, 84 connecting the plus side of the D. C. supply through a conductor 110, contacts 83, 84, to the contacts of the discriminating relay 73, 74. Thereafter and depending upon the operation of the discriminating amplifier one or the other of the relays 73, 74 will become operative to energize one or the other of the field coils 76, 77 and the armature of the servomotor 12. It will be seen that the power of D. C. energizing circuit for the automatic pilot may be deenergized by opening the momentary switch 86 deenergizing relay 79 or by operation of one or the other of the contacts 93, 94 of the limit switch assembly and thereby disengaging the relay 79 as well as deenergizing clutch 91 and the servomotor as well as other components of the automatic pilot energized from the D. C. supply and not shown herein.

The operation of servomotor 12 causes rotation of the output shaft to displace the control surface through the clutch 91 and also moves the servo balance pot wiper 38 through shaft 44 connected to the output shaft. An extension of the shaft 44, indicated generally at 90, operates as will be later noted the contacts 93, 94 of a variable limit switch assembly 92. In Figure 1 the limit switch assembly is shown in block form only, the details being disclosed in Figure 2. The only electrical components of the variable limit switch assembly shown in Figure 1 are the switches 93, 94 and a solenoid coil 95. The solenoid coil 95 is a braking solenoid of the limit switch assembly which will be more fully described below. This coil is electrically independent from the automatic pilot except for deriving its energization from the D. C. source 75. Energization of the braking solenoid whose operation will be explained hereinafter is controlled by a switching device 108 mounted on the output axis 107 of a conventional yaw rate gyroscope shown schematically at 109 which when the aircraft is turned will precess against the operation of restraining springs 106 to operate the switching device 108 and connect the braking solenoid to D. C. supply 75. The electrical circuit for this phase of the apparatus is as follows: plus side of battery 75, conductor 115, coil 95, conductor 112, to movable contact 113 of a switching device connected to the output axis of the yaw rate gyroscope 109, to one or the other of a pair of electrically connected stationary contacts 114 of the switching device 108, to ground connection 116 and from ground 81 to battery 75. It will be seen that regardless of the direction of turn of the aircraft, displacement of the gyroscope will cause one or the other of the stationary contacts 114 of device 108 to be engaged by movable contact 113 and provide the same energizing circuit for the braking solenoid coil 95.

In addition to the power control circuit referred to above, the automatic pilot equipment includes a control circuit engage switch or relay 31 which disconnects or connects the alternating power source 100 to the primary winding 30 of the control transformers. Engage relay 31 includes a coil 96 which is connected across the supply 100 by a conductor 102 and a conductor 101 to a manually operated switch 97 and a conductor 98. The manually operated switch 97 when moved in the closed direction, operates to close the energizing circuit for the relay coil 96 operating the contacts of the relay 31 to connect the alternating source of power to the primary winding 30. This engage relay and control power circuit is not affected by disengage safety devices such as the momentary switch 86 and the limit switch contacts 93, 94 inasmuch as it controls merely the application of power to the control circuit and the amplifier and it is normally desired to maintain the control circuit in standby operation even though the autopilot is not engaged. Thus disengagement is effected merely by control through the power or energizing circuit for the autopilot controlling equipment such as the servomotors. Thus it will be seen that the limit switch assembly does not operate to disengage power to the controlling portions of the autopilot network and the amplifier.

The limit switch assembly 92 is shown in detail in Figure 2, and it will be seen that it is adapted to be mounted on a portion of the housing of the servomotor indicated generally at 120 common to the servo balance potentiometer assembly 17 to be operated by the shaft 44 which operates the servo balance potentiometer. In Figure 2 it will be seen that the wiper 38 of the servo balance potentiometer 17 is carried on the shaft 44 through suitable clamping means and the associated resistor winding 37 is mounted in a flange or bracket indicated at 121 and having a conventional slip ring arrangement 124 associated therewith. Concentric with the shaft 44 and attached to the housing 120 by suitable screws and positioned by pins 122 is a housing 123 for the limit switch assembly. Positioned within this housing 123 is the shaft 90 which acts as an extension of the shaft 44 being connected thereto by suitable means such as splining so that it will be driven by the rotation of shaft 44. Mounted adjacent the wiper 38 on shaft 44 and secured thereto by suitable means such as a lock nut 125 is an arm 126 having a pin extremity 127 extending normal thereto. The pin 127 cooperates with one or the other of the flanged extremities of a pair of spring drive members 130, 131 which enclose and are attached to respectively the ends of a spiral spring indicated at 132. The spring drive member 131 as will be seen in the drawing is attached to a sleeve 133 concentric with the shaft 90 and mounting one extremity of the spiral spring 132 through a pin indicated at 135. The sleeve 133 is journalled or loosely mounted on the shaft 90 and it in turn mounts the drive member 130 through a sleeve type mounting such that the parts may rotate relative to one another. The drive member 130 attaches to the opposite extremity of the spiral spring, not shown in the drawing. Also cooperating with the flanged portions of the spring drive members 130, 131, only the flange of the drive member 130 being shown in the drawing, is a pin 138 which is mounted on a circular plate 130 having a toothed periphery 141. It will be understood from the drawing that the arm 126 is driven by the shaft 44 and hence urges the pin 127 mounted thereon into engagement with one or the other of the spring drive arms 130, 131 additionally tensioning the spring 132. It will be noted that pins 138 and 127 are placed at different radial distances from the shaft 90 about which they are concentrically located and consequently do not interfere with one another. Depending upon which of the spring arms 130, 131 are engaged by pin 127, the opposite arm will in response to the tensioning of the spring 132 engage the pin 138 and drive the same in the direction of rotation of the pin 127. The pin 138 being attached to the geared plate 139 will cause the plate 139 to be driven in response to movement of the pin 138. Plate 139 is mounted on a sleeve 140 which is journalled through suitable means such as sleeve type bearings 145 on the shaft 90 and mounts a paddle 142 of a viscous damper. The viscous damper includes a stationary housing 143 with an opening 144 or cavity therein within which the paddle 142 is located and within which opening a viscous medium or fluid is contained, the casing 143 being attached to an end wall portion 150 of the casing member 123 of the limit switch assembly. Suitable sleeve type bearings 146 are positioned between sleeve 140 and housing 143 to provide for relative movement therebetween. Screw means indicated at 151 secure the casing to the end wall 150. The casing includes suitable sealing members such as gaskets indicated at 153 which prevent leakage of the fluid from the cavity 144 of the casing. Also included in the casing is a plugged aperture 154 through which the fluid medium is inserted. Inasmuch as the viscosity of the fluid medium might be apt to change over varied temperature ambient, a heater element indicated only in phantom at 156 and a thermostat indicated in phantom at 157 can be mounted on the casing 143 to maintain the ambient of the fluid within a predetermined range. Inasmuch as the heater and temperature controller and the associated energizing circuit are required only for wide ambient temperature changes and their details are not of importance herein to the operation of the limit switch assembly, these elements are shown only in phantom. The extremity of sleeve 140 remote from the plate 139 mounts a gear member 160 which is mounted and secured thereon through suitable clamping means indicated at 161. Gear 160 cooperates with a pinion 162 mounted on a shaft 163 which is journalled in suitable bearing means 164 mounted in end plate 150 at one extremity and in a supporting plate 165, the mounting of which will be later described. Cooperating with pinion 162 is a gear 170 mounted on a shaft 171 which is also journalled between the end plate 150 of casing 123 and supporting plate 165 through suitable means not shown. Included on shaft 171 is a pinion 172 driven thereby which cooperates with a gear 174 mounted on a sleeve 175 which is supported by and journalled on sleeve 140 at one extremity by a bearing 176 and on shaft 90 by a bearing 177 respectively. Gear 174 is mounted on the sleeve 175 through suitable means not shown and the opposite extremity of the sleeve carries a switch mounting arm 179 carrying the switch 94 at the extremity thereof, being retained thereon by a bracket 180, the mounting arm being secured to the sleeve by a suitable clamping indicated at 181. Thus it will be seen that rotation of gear 160 will cause pinion 162 to drive the gear 170 and hence pinion 172 in a particular direction, the pinion 172 driving gear 174 and hence the sleeve 175 and switch mounting arm 179.

Also mounted on shaft 163 is a gear 182 which cooperates with a gear member 183 mounted on a second sleeve 184 which is journalled on the sleeve 175 through suitable sleeve type bearing means indicated at 186. Gear 183 is clamped to the sleeve 184 through suitable clamp nut means indicated at 187. The extremity of sleeve 184 opposite the mounting of gear 183 mounts a switch arm 188 carrying a switch 93 at the extremity thereof, the switch being carried on arm 188 by a bracket 190 and being mounted on the sleeve 184 through suitable means not shown. It will be seen that rotation of the gear 160 driving pinion 162 will also drive a separate gear train from that cooperating with the switch arm 179 and switch 94 in the form of a drive starting with gear 182 through gear 183 and sleeve 184 to switch arm 188 and switch 93. Also clamped on the extremity of shaft 90 being held in position by a nut 192 is a cam member 198 which cooperates with either of the switches 94 and 93 driven through the gearing described above. The details of these switches are not included herein inasmuch as they form no part of the present invention but it is understood that a suitable switch such as a microswitch unit may be used. Similarly the details of the electrical connections to the switches are not of importance except that they are included in the circuit in the manner described in connection with Figure 1. Plate 165 which serves to support the shafts 163 and 171 of the gear train is joined on sleeve 184 through suitable ball type journalling means indicated at 195 and is supported on housing 123 through extensions 196. Enclosing the gearing and switches is a suitable removable cover indicated at 200 which fits over a flanged portion 201 of the frame 123 of the variable limit switch assembly. Also included on the surface of the casing 123 is a solenoid 202, the winding or coil 95 of which has been previously discussed. This solenoid includes a movable plunger portion 203 attached to a shaft 204 having a braking or toothed extremity 205 adapted to engage the toothed periphery or toothed portion 141 of plate 139. The shaft 204 is biased through a spring 206 to a position where the brake shoe or toothed shoe 205 is out of engagement with the teeth 141 of plate 139. Upon energization of the solenoid, the spring 206 is compressed and the brake shoe 205 engages a toothed periphery 141 of plate 139 to rigidly hold the same in a fixed position.

It will be seen that the limit switch assembly upon rotation of shaft 44 causes the arm 126 to engage one or the other of the spring drive arms 130, 131 and through the tension applied to spring 132 drive the pin 138 and hence the plate 139 in a direction to follow the rotation of the shaft. Rotation of the plate 139 causes sleeve 140 to rotate the paddle 142 of the viscous damper within the fluid contained in the casing 143 of the damper at a rate determined by the viscosity of the fluid and the tensioning of the spring 132. Assuming temperature conditions to be constant, the rotation of the sleeve 140 will be an average of the rotation of the servomotor. Its rotation will be dependent upon speed and the amount of rotation of the shaft 44 and the clamping of the viscous damper. Continuing now with the gear drive it will be seen that the rotation of the sleeve 140 with the paddle 142 thereon will cause the gear trains described above to rotate urging switches 93, 94 in opposite directions of rotation, one rotating in the same direction as the cam 195 mounted on the extremity of the shaft 90 splined to shaft 44 and the other in an opposed direction. As will be pointed out more fully hereinafter, the ratio of the various gears or gear teeth in the two gear trains is such as to cause the switches to be brought closer together or the spacing between the switches to be diminished as the shaft 44 rotates in one direction and to move the switches apart as the shaft rotates in the opposite direction. The ratio of the gearing is such as to provide rotation of the switches 93, 94 respectively so that they will follow particular curves or relationships with respect to the position of the output shaft of the servomotor and hence the shafts 44 and 90 with the cam 195 thereon. It will also be seen that if the shaft 44 and hence the shaft 90 and the cam 195 driven thereby is rotated beyond the average position such as being rotated rapidly for a given period of time or through a given angular distance, one or the other of the switches 93, 95 will be engaged.

Operation

As pointed out above, the details of the network 10, amplifier 11, and servomotor 12 are largely conventional in the design of an automatic pilot for an aircraft. The present invention is directed to an improved automatic pilot system including a limit switch assembly designed primarily as a safety device to be used with the automatic pilot in the event of malfunction of the automatic pilot. The actual functioning of the various parts of the variable limit switch assembly 92 has been included above in connection with the description of the parts thereof for the purpose of better understanding the relationship between those parts.

Referring now to Figure 1 it should be noted that the operation of the network 10, amplifier 11 and servo 12 making up the automatic pilot system is conventional with that described in connection with the above-named Ciscel application and the Gille patent on the disclosure of the amplifier 11. The subject limit switch assembly is normally not operated except in the event of malfunction of the automatic inasmuch as operation of the servomotor will generally cause an attitude change in the aircraft sufficient to compensate for the displacement sensed by the controller or vertical gyroscope 35 and thereby deenergize the servomotor 12 before the limit switches are approached. Under automatic control, that is with both control and power energizing circuits energized the pitch axis of the vertical gyroscope 35 controls the pitch axis potentiometer and any displacement from a predetermined attitude for which the gyroscope has been set will be sensed by the pitch axis potentiometer 15 causing unbalance in the network 10 and energizing the amplifier 11. Depending upon the sense of the output signal of the network 10 one or the other of the relays 73, 74 will be operated to energize one or the other of the directional field windings 76, 77 of servomotor 12 together with its armature through the circuit described above to cause operation of the servomotor and rotation of the control surface to bring the aircraft to an attitude wherein the gyroscope reaches its set or predetermined position thereby bringing the wiper 21 of the pitch axis potentiometer back to its original position with respect to the winding 20 of the potentiometer. Simultaneous with the operation of the servomotor is displacement of the wiper 38 of the servo balance potentiometer which tends to offset or counteract the signal output of the pitch axis potentiometer and hence prevent overshooting or over-control by the autopilot. As previously indicated the ratio and centering potentiometers are adjusted prior to flight to establish a null output from the network 10 when the wipers of the servo balance potentiometer 17 and pitch axis potentiometer 15 are centered on their respective windings. Also the ratio potentiometer determines the effect of the servo balance potentiometer in counteracting the output signal from the pitch axis potentiometer. The up-elevator potentiometer 16 is included in the network and operated from the roll axis of the vertical gyroscope to introduce an up-elevator signal into the network 10 upon turning of the aircraft. This function is designed to offset the normal loss of altitude of an aircraft in turns. The trimmer potentiometer 64 associated therewith determines the amount of the up-elevator signal to be fed to the amplifier 11. Also in turns, the yaw rate gyro 109 becomes effective to operate or energize the solenoid 95 of the limit switch assembly locking the plate 139 with respect to the casing 123 and consequently precluding movement of the limit switches 93, 94. As was pointed out above, an up-elevator signal is generally inserted into the autopilot upon turning of the aircraft and in order to compensate or counteract for the false indication of this up-elevator signal with respect to the limit switches, the solenoid is operated to hold the limit switches with the particular spacing between the switches which existed when the aircraft entered into the turn. The introduction of up-elevator signal and the movement of the control surface in an up-elevator direction would normally cause the spacing between the limit switches to widen somewhat indicating a slower flight and since this is not necessarily the case in turns, the switches are locked in the position in which they were when the aircraft entered the turn. It has been found in certain instances that this phase of the operation is not necessary in some aircraft and hence the solenoid locking provisions of the limit switches in turns together with the yaw rate gyro controlling the same can be eliminated.

Upon operation of the servomotor, as indicated above, the rotation of the output shaft of the servomotor causes the shaft 90 of the limit switch assembly to rotate the cam 198 at the rate of rotation or output of the servomotor. At the same time the arm 126 will be driven from the shaft 44 causing one or the other of the arms 130, 131 to additionally tension the spring 132 and move the spring drive arm not engaged by the arm 126 to follow and driving the plate 139 and hence the viscous damper paddle 142 at a rate determined by the viscosity of the fluid in the damper to time average the movement of shaft 44. The rotation of the paddle 142 and hence the shaft 140 will drive the gears 160, 162, 170, 172, and 174 to move switch mounting arm 179 and switch 94 in the direction opposite to the rotation of the shaft 90 and to a position indicated by the relationship of one of the allowable travel limit curves of Figure 5 with respect to the trim position. Similarly the switch arm 188 and switch 93 will be driven by the gearing 160, 162, 182 and 183 to the position indicated by the other allowable travel limit curve of Figure 5 referenced to the trim position and in the same direction of rotation as the output shaft. In the event that the rotation of the output shaft exceeds the rotation of one or the other of the switches 93, 94 with respect to the shaft 90, one or the other of the switches will be operated to open, deenergizing the engage relay 79 causing the clutch 91 and servomotor 12 to be deenergized and the aircraft returned to manual control with the control circuit energized and operative but not effective to control servomotor 12. It will also be seen that whether the control surface is in an up-elevator or down-elevator position, that operation of the servomotor in either direction from the trim position will cause operation of the spring drive and viscous damper to time average the servomotor rotation and position the switches in the same manner but with differing spacings relative to one another.

In considering this invention, it should be kept in mind that the present disclosure is intended to be illustrative only and that the scope of the invention is to be determined by the appended claims.

We claim as our invention:

1. Apparatus for controlling a servomotor operating a control surface of an aircraft to maintain a predetermined condition of flight of the aircraft, comprising, a servomotor for controlling the position of said control surface of said aircraft, power circuit means for energizing said servomotor, a control circuit means operative upon an indication of a need for operating said servomotor to maintain the predetermined condition of flight of the aircraft for controlling the operation of said power circuit means, limit switch means including cam means and a pair of limit switches adapted to be operated thereby, means connecting said cam means to said servomotor to be operated directly thereby, means drivingly connecting said limit switches to said servomotor including a spring and viscous damper with different ratio gearing driving each of said switches, said gearing rotating said switches relative to one another and to said cam in proportion to the allowable travel limits of said control surface for said predetermined condition of flight of the aircraft, said limit switch means being adapted to further control the operation of said power circuit means.

2. Apparatus for controlling a servomotor operating a control surface of an aircraft to maintain a predetermined condition of flight of the aircraft, comprising, a servomotor for controlling the position of said control surface of said aircraft, power circuit means for energizing said servomotor, a control circuit means operative upon an indication of a need for operating said servomotor to maintain the predetermined condition of flight of the aircraft for controlling the operation of said power circuit means, limit switch means including cam means and a pair of limit switches adapted to be operated thereby, means connecting said cam means to said servomotor to be operated directly thereby, means drivingly connecting said limit switches to said servomotor including a spring and viscous damper with different ratio gearing driving each of said switches, said gearing rotating said switches relative to one another and to said cam in proportion to the allowable travel limits of said control surface for said predetermined condition of flight of the aircraft, said limit switch means being adapted to further control the operation of said power circuit means, and means responsive to turning of said aircraft for holding said limit switches independent of the rotation of said servomotor.

3. Apparatus for controlling a servomotor operating a control surface of an aircraft to maintain a predetermined condition of flight of the aircraft, a servomotor adapted to be connected to the control surface of the aircraft, power circuit means for energizing said servomotor, a control circuit means operative upon an indication of a need for operation of said servomotor to maintain the predetermined condition of flight of the aircraft for controlling the operation of said power circuit means, a pair of limiting devices and operating means therefor, means connecting said limiting devices and said operating means to said servomotor such that said limiting devices will have a differential therebetween in proportion to a predetermined set of allowable travel limits for said control surface of the aircraft corresponding to the time averaged position of said control surface of the aircraft at that instant and so that the operating means will be in position to cooperate with one of said limiting devices, and means included in said connection means for permitting said operating means to engage one of said limiting devices if the instantaneous displacement of control surface of said aircraft exceeds the time averaged position of the control surface said limiting devices further controlling the operation of said power circuit means.

4. Apparatus for controlling a servomotor operating a control surface of an aircraft to maintain a condition of flight of the aircraft, a servomotor adapted to be connected to the control surface of the aircraft, power circuit means for energizing said servomotor, control circuit means operative upon an indication of a need for operation of said servomotor to maintain the predetermined condition of flight of the aircraft for controlling the operation of said power circuit means, a pair of limiting devices and an operating means therefor, means connecting the operating means of said limiting devices to said servomotor, a flexible connection connected to said servomotor and transmitting movement of said servomotor in proportion to its speed of rotation and elapsed time of rotation, gearing means connecting said flexible connection and said limiting devices to rotate one said limiting devices in the same direction of rotation as said servomotor and one in the opposite direction of rotation from said servomotor and varying the spacing between the limiting devices to cause the limiting devices to approach one another for one direction of rotation of the servomotor and to depart from one another with an opposite direction of rotation of the servomotor, and means included in said power circuit means and operated by one or the other of said limiting devices for further controlling the operation of said power circuit means.

5. Apparatus for controlling a servomotor operating a control surface of an aircraft to maintain a condition of flight of the aircraft, a servomotor adapted to be connected to the control surface of the aircraft, power circuit means for energiizng said servomotor, control circuit means operative upon an indication of a need for operation of said servomotor to maintain the predetermined condition of flight of the aircraft for controlling the operation of said power circuit means, a pair of limiting devices and an operating means therefor, means connecting the operating means of said limiting devices to said servomotor, a flexible connection connected to said servomotor and time averaging the movement of said servomotor, gearing means connecting said flexible conection and said limiting devices to rotate on said limiting devices in the same direction of rotation as the servomotor and the other of said limiting devices in an opposite direction of rotation and varying the spacing between the limiting devices to cause the limiting devices to approach one another for one direction of rotation of the servomotor and to depart from one another with an opposite direction of rotation of the servomotor, means included in said power circuit means and operated by one or the other of said limiting devices for further controlling the operation of power circuit means, and means responsive to turning of said aircraft for locking said limiting devices.

6. Apparatus for controlling a servomotor operating a control surface of an aircraft to maintain a predetermined condition of flight of the aircraft comprising power circuit means for energizing said servomotor, control circuit means connected to said power circuit means and operative upon an indication of a need for operation of said servomotor to maintain the predetermined condition of flight of the aircraft for controlling the operation of said power circuit means, a limit switch assembly including a plurality of relatively movable parts two of which cooperate with a third part to perform a switching operation for either direction of rotation of the servomotor, a differential gearing means connected to said two parts of said limit switch assembly to rotate said parts in the different directions of rotation and varying the spacing between said parts to cause them to approach one another for one direction of rotation of the servomotor and to depart from one another with an opposite direction of rotation of the servomotor, flexible connection means connecting said gearing and said servomotor to transmit an average of the movement of said servomotor to said gearing and said two parts of said limit switch assembly, further means connecting said first part of said limit switch assembly to said servomotor to be directly operated thereby, and means connecting said limit switch assembly to said power circuit means such that it will be further operated by said limit switch assembly.

7. Apparatus for controlling the flight of an aircraft comprising, a servomotor adapted to be connected to a control surface of an aircraft to maintain a predetermined condition flight of the aircraft, power circuit means for energizing said servomotor, control circuit means for controlling the operation of said power circuit means, means included in said control ciruit means and operative upon an indication of a need for operation of said servomotor to maintain the predetermined condition of flight of the aircraft for controlling the output of said control circuit means, a variable limit switch assembly for further controlling the operation of said power circuit means and including a pair of relatively movable parts and a cooperating operating means for said parts, a slowly operative motor means controlled by the operation of said servomotor, differential gearing driven by said slowly operative motor means and connected to said pair of parts of said limiting assembly for varying the differential between said parts depending upon the direction of rotation of said servomotor, and means connecting said operating means to said servomotor such that it will operate one of said parts when the rotation of the servomotor exceeds that of said slowly operated motor.

8. Apparatus for controlling the flight of an aircraft comprising, a servomotor adapted to be connected to a control surface of an aircraft to maintain a predetermined condition of flight of the aircraft, power circuit means for energizing said servomotor, control circuit means for controlling the operation of said power circuit means, means included in said control circuit means and operative upon an indication of a need for operation of said servomotor to maintain the predetermined condition of flight of the aircraft for controlling the output of said control circuit means, a varaible limit switch assembly for further controlling the operation of said power circuit means and including a pair of relatively movable parts and a cooperating operating means for said parts, a slowly operative motor means controlled by the operation of said servomotor, and operative to average the rotation of said servomotor, differential gearing driven by said slowly operative motor means and connected to said pair of parts of said limiting assembly for varying the differential between said parts depending upon the direction of rotation of said servomotor, means connecting said operating means to said servomotor such that it will operate one of said parts when the rotation of the servomotor exceeds that of said slowly operated motor, and means operative to brake said slowly operative motor means upon turning of said aircraft.

9. Apparatus for controlling the flight of an aircraft comprising, a servomotor adapted to be connected to a control surface of the aircraft to maintain a predetermined condition of flight of the aircraft, power circuit means for energizing said servomotor, control circuit means for controlling the operation of said power circuit means, means included in said control circuit means and operative upon an indication of a need for operation of said servomotor to maintain the predetermined condition of flight of the aircraft for controlling the output of said control circuit means, a slowly operated motor means controlled by the operation of said servomotor, a variable limit switch assembly including a pair of relatively movable parts and a third part, a differential gearing connecting said relatively movable parts of said limit switch assembly to said slowly operated motor means for positioning the same such that the spacing between said parts will be proportional to a set of allowable travel limits of the control surface of the aircraft for the time averaged position of the control surface of the aircraft at that instant, means connecting said third part to said servomotor to cooperate with said pair of relatively movable parts such that said limit switch assembly will be operated if the rotation of the servomotor exceeds the time averaged position of the control surface of the aircraft, and means operated by said limit switch assembly for deenergizing said power circuit means.

10. In combination, with a servomotor, an output shaft, switch operating means mounted on said output shaft, a first lever connected to and driven by said output shaft, spring drive assembly journalled on said output shaft and adapted to be engaged and operated by said lever, a second lever adapted to be engaged and driven by said spring drive assembly, a viscous damper including a pair of relatively movable parts, said second lever being connected to one of said relatively movable parts of said viscous damper, a differential gear train assembly including a pair of gear trains connected to said one of said relatively movable parts of said viscous damper, a pair of switches connected respectively to said pair of gear trains and positioned concentric with said output shaft and said switch operating means, said gear trains being designed to rotate one of said switches in the same direction of rotation as said servo output shaft upon rotation of said servo shaft and the other in the opposite direction from said servomotor and varying the spacing between said switches to cause said switches to approach one another for one direction of rotation of said shaft and to depart from one another in the opposite direction of rotation of said output shaft, and casing means enclosing said output shaft and said switch and mounting said gearing and said other part of said viscous damper, said casing means being attached to said servomotor.

11. In combination with a servomotor, an output shaft, switch operating means mounted on said output shaft, a first lever connected to and driven by said output shaft, a spring drive assembly journalled on said output shaft and connected adapted to be engaged and operated by said lever, a second lever adapted to be engaged and operated by spring drive assembly, a viscous damper including a pair of relatively movable parts, said second lever being connected to one of said relatively movable parts of said viscous damper, a differential gear train assembly including a pair of gear trains connected to said one of said relatively movable parts of said viscous damper, a pair of switches connected respectively to said pair of gear trains and positioned concentric with said output shaft and said switch operating means, said gear trains being designed to rotate said switches upon rotation of said servo shaft varying the spacing between said switches to cause said switches to approach one another for one direction of rotation of said shaft and to depart from one another in the opposite direction of rotation of said output shaft, casing means enclosing said output shaft and said switches and mounting said gearing and said other part of said viscous damper, said casing means being attached to said servomotor, and solenoid means mounted on said casing and including a brake means operative to arrest movement of said switches.

12. Apparatus for controlling the operation of a servomotor, an energizing circuit means for said servomotor, control circuit means for controlling the operation of said energizing circuit means, means included in said control circuit means and operative upon an indication of a need for operation of said servomotor for controlling the operation of said control circuit means, a variable limit switch assembly adapted to be mounted on and operated by said servomotor including a pair of relatively movable parts and a cooperating operating means for said parts, a slowly operative motor means controlled by the operation of said servomotor, differential motion transmission means driven by said slowly operative motor means and connected to said pair of parts of said limit switch assembly for varying the differential between said parts depending upon the direction of rotation of said servomotor, means connecting said operating means to said servomotor such that it will operate one of said parts when the rotation of said servomotor exceeds that of said slowly operated motor, and means connecting said variable limit switch assembly to said energizing circuit means for said servomotor to further control the operation of said energizing circuit means.

13. Apparatus for controlling the operation of a servomotor, an energizing circuit means for said servomotor, control circuit means for controlling the operation of said energizing circuit means, means included in said control circuit means and operative upon an indication of a need for operation of said servomotor for controlling the operation of said control circuit means, a variable limit switch assembly adapted to be mounted on and operated by said servomotor including a pair of relatively movable parts and a cooperating operating means for said parts, a slowly operative motor means controlled by the operation of said servomotor for time averaging the rotation of said servomotor, differential gearing driven by said slowly operative motor means and connected to said pair of parts of said limit switch assembly for varying the differential between said parts depending upon the direction of rotation of said servomotor, means connecting said operating means to said servomotor such that it will operate one of said parts when the rotation of said servomotor exceeds that of said slowly operated motor, means connecting said variable limit switch assembly to said energizing circuit means for said servomotor to further control the operation of said energizing circuit means, and means operative to brake said slowly operative motor means.

14. Apparatus for controlling the operation of a servomotor comprising with a servomotor, an energizing circuit means for said servomotor, control circuit means for controlling the operation of said energizing circuit means, means included in said control circuit means and operative upon a need for operation of the servomotor for controlling the output of said control circuit means, a variable limit switch assembly for further controlling the operation of said energizing circuit means and including a pair of relatively movable parts and a third part, a differential gearing connected to said relatively movable parts of said limit switch assembly, a slowly operated motor controlled by the operation of said servomotor, means connecting said differential gearing to said slowly operated motor means to position said differential gearing and said relatively movable parts of said limit switch such that the spacing between said relatively movable parts of said limit switch assembly will vary for different directions of rotation of said servomotor, means connecting said third part to said servomotor to cooperate with said pair of relatively movable parts such that said limit switch assembly will be operated if the rotation of the servomotor exceeds the rotation of said slowly operated motor means.

15. In combination with a servomotor, an output shaft connected to said servomotor, switch operating means mounted on said output shaft, a second shaft connected to said output shaft, a slowly operative motor means connected to and driven by said second shaft for time averaging the rotation of said second shaft, a differential gear train assembly including a pair of gear trains connected to said slowly operative motor means, a pair of switches connected respectively to said pair of gear trains and positioned concentric with said switch operating means, said gear trains being designed to rotate one of said switches in the same direction of rotation as said switch operating means upon rotation of said servomotor and the other of said switches in the opposite direction from said switch operating means and varying the spacing between said switches to cause said switches to approach one another for one direction of rotation of said servomotor and to depart from one another in the opposite direction of rotation of said servomotor, and casing means enclosing said output shaft and said switches together with said slowly operative motor means, said casing means being attached to said servomotor.

16. In combination with a servomotor, an output shaft connected to said servomotor, switch operating means mounted on said output shaft, a second shaft connected to said output shaft, a slowly operative motor means connected to and driven by said second shaft for integrating rotation of said second shaft, a differential gear train assembly including a pair of gear trains connected to said slowly operative motor means, a pair of switches connected respectively to said pair of gear trains and positioned concentric with said switch operating means, said gear trains being designed to rotate said switches upon rotation of said servomotor varying the spacing between said switches to cause said switches to approach one another for one direction of rotation of said servomotor and to depart from one another in the opposite direction of rotation of said servomotor, casing means enclosing said output shaft and said switches together with said slowly operative motor means, said casing means being attached to said servomotor, and solenoid means mounted on said casing including a brake means effective to arrest the movement of said slowly operative motor means.

17. In flight control apparatus, a servomotor adapted to be connected to a control surface of an aircraft to maintain a condition of flight of the aircraft, power circuit means for energizing said servomotor, a control circuit means for controlling the operation of said power circuit means, said control circuit means including means operative upon an indication for need of operation of said servomotor to control the operation of said control circuit means, a variable limit switch assembly including a pair of limit switches and an operating means therefor, means connecting said operating means to said servomotor for operation thereby, a differential gearing connected to the said limit switch devices and varying the angular spacing therebetween depending upon the direction and amount of rotation of said gearing, a slowly operative means connecting said servomotor and said differential gearing and operated by said servomotor for positioning said limit switches relative to said operating means in proportion to the average position of said operating means, said limit switches becoming operative when the rotation of the servomotor exceeds that of said slowly operative means, and means energizing said power circuit means and controlled by the operation of said limit switches.

GEORGE W. RUSLER, Jr.
ROBERT C. BURGGREN.

References Cited in the file of this patent

UNITED STATES PATENTS

| Number | Name | Date |
|---|---|---|
| 2,442,711 | Schaedler | June 1, 1948 |
| 2,615,154 | Wade | Oct. 21, 1952 |